United States Patent
Wolter et al.

(10) Patent No.: US 10,236,534 B2
(45) Date of Patent: Mar. 19, 2019

(54) ELECTRICAL ENERGY STORAGE ELEMENT, METHOD AND APPARATUS FOR PRODUCING SAID ELECTRICAL ENERGY STORAGE ELEMENT

(71) Applicants: FRAUNHOFER-GESELLSCHAFT ZUR FOERDERUNG DER ANGEWANDTEN FORSCHUNG E.V., Munich (DE); THYSSENKRUPP SYSTEM ENGINEERING GMBH, Heilbronn (DE); THYSSENKRUPP AG, Essen (DE)

(72) Inventors: Mareike Wolter, Dresden (DE); Kristian Nikolowski, Dresden (DE); Uwe Partsch, Dresden (DE); Michael Roscher, Gruena (DE); Thomas Echelmeyer, Chemnitz (DE); Daniel Tittel, Freiberg (DE); Michael Clauss, Chemnitz (DE)

(73) Assignees: FRAUNHOFER-GESELLSCHAFT ZUR FOERDERUNG DER ANGEWANDTEN FORSCHUNG E.V., Munich (DE); THYSSENKRUPP SYSTEM ENGINEERING GMBH, Heilbronn (DE); THYSSENKRUPP AG, Essen (DE)

( * ) Notice: Subject to any disclaimer, the term of this patent is extended or adjusted under 35 U.S.C. 154(b) by 227 days.

(21) Appl. No.: 15/530,119

(22) PCT Filed: Jun. 5, 2015

(86) PCT No.: PCT/EP2015/062573
§ 371 (c)(1),
(2) Date: Dec. 5, 2016

(87) PCT Pub. No.: WO2015/185723
PCT Pub. Date: Dec. 10, 2015

(65) Prior Publication Data
US 2018/0034107 A1    Feb. 1, 2018

(30) Foreign Application Priority Data
Jun. 5, 2014  (DE) .................. 10 2014 210 803

(51) Int. Cl.
*H01M 10/0585* (2010.01)
*H01M 4/525* (2010.01)
(Continued)

(52) U.S. Cl.
CPC ..... *H01M 10/0585* (2013.01); *H01M 2/0486* (2013.01); *H01M 4/483* (2013.01);
(Continued)

(58) Field of Classification Search
CPC ......... H01M 10/0565; H01M 10/0585; H01M 10/48; H01M 10/52; H01M 10/63;
(Continued)

(56) References Cited

U.S. PATENT DOCUMENTS 4,720,227 A * 1/1988 Eberle .................. H01M 10/14
271/103
5,824,434 A * 10/1998 Kawakami .............. H01M 2/14
429/209
(Continued)

FOREIGN PATENT DOCUMENTS

CN    103081203 A    5/2013
DE    102010031543 A1    1/2012
(Continued)

*Primary Examiner* — Carlos Barcena
(74) *Attorney, Agent, or Firm* — Jacobson Holman, PLLC.

(57) ABSTRACT

In the electrical energy storage element in accordance with the invention, a plurality of electrochemical cells that are
(Continued)

each formed with a cathode and an anode as electrodes and an electrolyte are arranged stacked above one another. They are enclosed at one side by a top plate formed from an electrically conductive material, in particular aluminum, and at the oppositely disposed side by a base plate formed from an electrically conductive material, in particular aluminum. The base plate is coated by a cathode or by an anode and the cover plate is coated in a complementary manner by an anode or by a cathode. The anodes and cathodes are each formed at oppositely disposed surfaces of an electrically conductive carrier film which preferably comprises aluminum, copper, steel or an electrically conductive plastic. An outer peripheral margin is present at the carrier film that is free of electrode material and connects adjacent electrochemical cells to one another in a hermetically sealed manner with respect to the environment by means of a sealing and bonding agent. The anodes comprise a lithium titanate (LTO) having a spinel structure and the high-voltage cathodes are formed from a lithium nickel manganate (LNMO) having a spinel structure or from lithium phosphates (LP) in an olivine structure. With a gel electrolyte, a respective separator layer is present between the electrolyte and an electrode of an electrochemical cell and with a solid electrolyte no separator layer is present.

12 Claims, 2 Drawing Sheets (51) Int. Cl.
*H01M 10/52* (2006.01)
*H01M 10/63* (2014.01)
*H01M 2/04* (2006.01)
*H01M 4/48* (2010.01)
*H01M 4/505* (2010.01)
*H01M 4/58* (2010.01)
*H01M 10/0565* (2010.01)
*H01M 10/48* (2006.01)

(52) U.S. Cl.
CPC .......... *H01M 4/505* (2013.01); *H01M 4/525* (2013.01); *H01M 4/5825* (2013.01); *H01M 10/0565* (2013.01); *H01M 10/48* (2013.01); *H01M 10/52* (2013.01); *H01M 10/63* (2015.04); *H01M 2300/0085* (2013.01)

(58) Field of Classification Search
CPC ....... H01M 2300/0085; H01M 2/0486; H01M 4/483; H01M 4/505; H01M 4/525; H01M 4/5825

See application file for complete search history.

(56) References Cited

U.S. PATENT DOCUMENTS

| 6,235,425 | B1* | 5/2001 | Hanson | H01M 4/04 |
| | | | | 29/623.3 |
| 8,889,287 | B2 | 11/2014 | Suzuki et al. | |
| 2009/0087739 | A1* | 4/2009 | Takahashi | H01M 4/131 |
| | | | | 429/188 |
| 2013/0093392 | A1 | 4/2013 | Odani et al. | |
| 2013/0101878 | A1 | 4/2013 | Pilgram et al. | |

FOREIGN PATENT DOCUMENTS

| JP | 2008140638 A | 6/2008 |
| WO | WO 2013/154623 A1 | 10/2013 |

* cited by examiner

ELECTRICAL ENERGY STORAGE ELEMENT, METHOD AND APPARATUS FOR PRODUCING SAID ELECTRICAL ENERGY STORAGE ELEMENT

The invention relates to an electrical energy storage element that is configured as large-format, flat, safe and having a special cytochemistry for a bipolar electrode design having an integral housing. The invention also relates to a method and to an arrangement for manufacturing these electrical energy storage elements.

Conventional lithium battery cells have previously been used (round, prismatic, having a metal housing or flat cells having a pouch film cover) that lead to a reduced energy density at the system level. Bipolar batteries are likewise known.

These cells are usually connected to one another in modules (approximately 60 V, approximately 12 cells). The individual modules are subsequently connected to form high-voltage (HV) energy stores and, together with peripheral sensor systems, a monitoring system (energy storage management system), a cooling system and a housing, form a safe energy storage element. It provides interfaces to the outside for, for example, vehicle communication, energy transmission, cooling and a mechanical connection to a vehicle.

It is therefore the object of the invention to provide electrical energy storage elements that achieve an increased energy density and that can be manufactured flexibly and inexpensively.

This object is achieved in accordance with the invention by electrical energy storage elements having the features of the claims set forth herein.

In the electrical energy storage element in accordance with the invention, a plurality of electrochemical cells that are each formed with a cathode and an anode as electrodes and an electrolyte are arranged stacked above one another. The stacked electrochemical cells are enclosed at one side by a cover plate formed from an electrically conductive material, in particular aluminum, copper or steel, and at the opposite side by a base plate formed from an electrically conductive material, in particular aluminum, copper or steel. The base plate is coated by a cathode or by an anode and the cover plate is coated in a complementary manner by an anode or by a cathode.

The anodes and cathodes are each formed at oppositely disposed surfaces of an electrically conductive carrier film which preferably comprises aluminum, copper, steel or an electrically conductive plastic. An outer peripheral margin is present at the carrier film that is free of electrode material and that connects adjacent electrochemical cells to one another in a manner hermetically sealed with respect to the environment by means of an inserted or adhesively bonded seal or by means of a sealing and bonding agent. UV wettable, thermally wettable single-component or two-component adhesives can be used as the sealing and bonding agents. In addition to a sealing agent, a separator element or a sealing element can also be used with which a barrier effect can be achieved between electrodes, the electrolyte and, optionally, the environment.

The anodes comprise a lithium titanate LTO having a spinel structure and the high-voltage cathodes are formed from a lithium nickel manganate LNMO having a spinel structure or from lithium phosphates (LP) in an olivine structure. With a gel electrolyte, a respective separator layer should be present between the electrolyte and an electrode of an electrochemical cell and with a solid electrolyte no separator layer should be present in contrast.

Anodes can preferably be formed from $Li_4Ti_5O_{12}$ as the LTO and the cathodes from $LiNi_{0.5}Mn_{1.5}O_4$ as the LNMO or lithium phosphates as the $LiCoPO_4$ or $LiNiPO_4$.

The problematic introduction of the electrolyte and of a separator layer into electrochemical cells (potentially larger-area electrode stacks) can be avoided in that the components of the electrochemical cells are printed. coated using a doctor knife or applied in a spatially resolved manner in a different process with a defined geometry. The separator layer/electrolyte composite should, on the one hand, have sufficient ionic conductivity and should, however, on the other hand, also be able to prevent a direct contact and thus a short circuit between the anode and the cathode. An electrolyte can be integrated into a separator layer, which is implemented, for example, by a metering into a partially porous separator that is present as a free-standing plate-shaped element or as a film printed on at least one of the two electrodes. A separator layer can be formed, for example, from porosity-forming inert materials (e.g. $Al_2O_3$) or ionically conductive materials (such as lithium-ion conductive glass materials) also together with a polymer matrix (e.g. polyvinylidene fluoride (PVDF), styrene-butadiene rubber (SBR), polyvinyl alcohol (PVA), polyvinyl butural (PVB) or carboxymethyl cellulose (CMC).

The electrolyte can be embedded with a salt conductive for lithium ions, in particular $LiPF_6$, LiTFSI or $LiClO_4$, that is formed by an organic carbonate, in particular ethylene carbonate, diethyl carbonate or propylene carbonate in a polymer matrix that is in particular formed with polyethylene oxide (PEO), polyvinylidene fluoride (PVDF), an acrylate or imidine. It can, however, also be formed with a polyelectrolyte, a polymer with ionizable anionic and/or cationic groups or with ionic liquids, in particular N-alkyl-N-methylpyrrolodinium bis(trifluoromethanesulfonyl)imide ($PYR_{14}TFSI$) and with LiTFSI as the salt conducting lithium ions or $Li_7P_3S_{11}$ or $Li_{1.5}Al_{0.5}Ge_{1.5}(PO4)_3$) as a crystalline ion conductor.

If a separator layer is required, it can be formed using ceramic materials such as $Al_2O_3$ or a glass conducting lithium ions such as so-called LAPT materials, preferably in particle form and using an organic binder. Particle sizes of approximately 500 nm to 30 μm are preferred in this respect. Polyvinylidene fluoride (PVDF), styrene-butadiene rubber (SBR), polyvinyl alcohol (PVA) or carboxymethyl cellulose (CMC) can be included in the separator layer.

A carrier film is respectively coated at two oppositely disposed surfaces with an anode material and at the oppositely disposed side with a cathode material in the manufacture of electrical energy storage elements in accordance with the invention such that an outwardly peripheral margin free of the respective electrode material remains or such that this margin is liberated from electrode material by the use of chemically, mechanically or thermally removing processes. At least one of the two electrodes is coated or wetted with a separator layer, a liquid or gel electrolyte and subsequently with electrolyte material. Since no separator layer is required with a solid electrolyte, the respective electrode can be directly coated with electrolyte material.

The separator layer and/or the electrolyte can be formed by application with a doctor blade, printing, spraying, dispensing, powder coating or by means of electrostatic processes.

Individual elements that each form an electrochemical cell are subsequently obtained by separation and are stacked above one another such that cathodes or anodes are always arranged facing upward and in this respect the bottommost electrochemical cell is applied to a base plate that has been coated with a cathode or an anode, with the respective complementary electrode, the electrode formed on the base plate, being arranged facing in the direction of this electrode. After reaching the desired number of electrochemical cells to be stacked, a top plate is placed onto the topmost electrochemical cell, with an electrode complementary to the topmost electrode of the topmost electrochemical cell being present on said top plate. A closure of the electrochemical cells with respect to the environment is then achieved by a seal or by a sealing and bonding agent, optionally also with an additional separator layer at the outer margins free of electrode material.

An electrical energy storage element therefore comprises a plurality of electrodes which in turn represent a composite of a conductive carrier film with active material composites applied to both sides. Provision is made that one respective side is coated with a cathode material, e.g. so-called 5V high-voltage cathode materials (e.g. LNMO or $LiCoPO_4$ or $LiNiPO_4$), that can also be modified (doped, coated) and one side is coated with LTO anode material. The electrodes have a margin not covered by an electrochemically active material peripherally at both sides. A seal or a sealing and bonding agent, optionally also a separator layer, is applied to the non-coated margin. A separator layer can be applied to the coating at one side of the electrode, e.g. the anode side, or to both sides of the respective electrochemical cell.

An electrolyte is located between the electrodes that is conductive for lithium ions and that wets or is in touching contact with the electrochemically active materials. The electrolyte can be formed from a mixture of organic solvents having a conductive salt or ionic liquids or polyelectrolytes or gel electrolytes.

As an embodiment thereof, a separator, e.g. comprising $Al_2O_3$ granulate with a binder (e.g. polyvinylidene fluoride (PVDF)), and an electrolyte, e.g. as a gel electrolyte or as a solid electrolyte, can be applied to one of the two electrodes in a suitable manner. On a use of a solid electrolyte, a separator layer between the electrolyte and the respective electrode can be dispensed with. A solid electrolyte can furthermore also be a component of the electrode coating (e.g. as an admixture of lithium thiophosphates in powder form), with then a gel/liquid electrolyte additionally being able to be used. In this respect, an organic carbonate, in particular ethylene carbonate, diethyl carbonate or propylene carbonate with a salt conducting lithium ions, in particular $LiPF_6$, LiTFSI or $LiClO_4$, embedded in a polymer matrix, in particular polyethylene oxide (PEO), polyvinylidene fluoride (PVDF), an acrylate or imidine can be used.

It can, however, also be formed with a polyelectrolyte, a polymer with ionizable anionic and/or cationic groups or with ionic liquids, in particular N-alkyl-N-methylpyrrolodinium bis(trifluoromethanesulfonyl)imide ($PYR_{14}TFSI$) and with LiTFSI as the salt conducting lithium ions or $Li_7P_3S_{11}$ or $Li_{1.5}Al_{0.5}Ge_{1.5}(PO4)3$ as a crystalline ion conductor.

The binary structure provides that the electrodes are stacked in a manner such that the anode side and the cathode side of an electrochemical cell are each opposite electrodes disposed above one another and that thus a plurality of electrochemical/galvanic cells in series connection result. A bottommost layer to topmost layer can form a base plate and a top plate that can be designed as aluminum sheets and that form the current collectors of the electrical energy storage element. For this purpose, the base plate and the top plate can likewise be coated with the respective electrode material and the base plate can be provided with the separator layer, the electrolyte and the sealing and bonding agent. The seals are applied to the margins of the electrodes or of the base plate or of the top plate in a manner such that they hermetically enclose the inner structure, prevent a contact of the film margins of adjacent electrodes and enclose the non-coated edges of the carrier films fixed on the electrodes.

Individual substacks formed from a plurality of electrochemical cells arranged above one another can be individually monitored for temperature and voltage within the structure to improve and/or ensure security in operation. The number of the electrochemical cells (bipolar cells) monitored in this manner can be different. In addition to the voltage monitoring, a charge compensation or a charge adaptation can also take place within the individual layers. The number of electrochemical cells monitored together should be in the range from 1 to at most 5 cells in this respect.

As an embodiment, the electron-conductive carrier films can be individually contacted with thin, insulated wires. The electric voltages of the individual electrochemical cells can be measured outside the electron energy storage element with the aid of the wires to detect a possible overload of individual electrochemical cells and optionally to absorb it by means of so-called symmetry devices. In this respect, the wires are tightly surrounded by sealing material. The measurement of the temperature can take place both via in-situ sensors in the cell and at the contact tabs and also via the analysis of externally applied stimuli and their system response. The following procedure can be used in the analysis of externally applied stimuli: A sinusoidal current of approximately 4 A is applied in a defined frequency range from mHz to kHz to the outer electrical contacts of the respective adjacent electrode pairs and the associated voltage response is measured. The system response is analyzed in a specific frequency range or phase range that is SOC-independent and aging-independent and the respective mean temperature of the electrode pair is determined.

A monitoring module, an interface module, a jacket module, and/or a temperature-control or cooling module can furthermore be present at an electrical energy storage element.

Measurement parameters at the electrochemical cells or cell groups (substacks) can be detected using a monitoring module. A check of the observation of safety-relevant limits can thus be made possible.

An interface module can comprise the components for the energy transfer, vehicle communication, degassing and, optionally, a cooling medium.

A jacket module can be an optional additional housing of the electrical energy storage element if it is exposed to direct environmental influences. It can satisfy both the protective function and more far-reaching interface functions. It can have openings for the interface module and for inspection openings. The design is dependent on the manner of the integration of the electrical energy storage element (stationary storage modules, vehicle integration).

A temperature-control or cooling module can allow an efficient temperature control of the electrical energy storage element either via evaporator cooling, liquid cooling or convection cooling. Due to the small internal resistances, a complex and/or expensive cooling may be dispensed with under certain circumstances due to the large-area design and the associated exchange surface. The power losses can be taken up by the battery and can be led off via thermal conduction and heat transfer to air or to the jacket module.

An interface module, a monitoring module and a jacket module should be designed such that they use the construction space in the best possible manner and can be installed in a common housing together with the electrical energy storage element. The construction space can be ideally exploited due to the high degree of system integration. The volume utilization factor of the system can be above 80%.

An electrical energy storage element can be configured by way of example for installation into a vehicle underbody and in a solar module (Embodiment 3).

A cooling/temperature control of an electrical energy storage element can be present in different variants. A cooling can be achieved by means of air, liquid cooling medium or an evaporator. Waste heat of one or more consumers, preferably electrical consumers, can be used for a temperature control at low environmental temperatures, whereby the electrical storage capacity can also be kept sufficiently high even under unfavorable conditions.

Electrical energy storage elements of any desired construction size, preferably with large-area electrodes, can be provided with the invention by the possible compact manner of construction.

The electrode manufacture, the assembly of the electrodes and of the base plate and top plate as well as the stacking of the electrodes between the base plates and top plates previously covered with functional layers are important in the manufacture of the electrical energy storage elements.

The electrode formation takes place by coating a carrier film on one side with LTO anode material; cathode material (LNMO or $LiCoPO_4$ or $LiNiPO_4$) are applied to the other side so that surfaces having an electrode coating and disposed above one another, so-called patterns, are formed. A peripheral, free marginal region not covered by a coating material is present around these patterns that later acts as a surface for sealant coating (electrochemically inactive surface) around the patterns.

The formation of the patterns can take place in that the electrode coating is continuously applied to a band of the carrier film using conventional doctor-blade application processes on both sides of the carrier film and the marginal region can subsequently be formed e.g. by thermal or chemical or mechanical removal of the coating material from the carrier film. This can take place before or after a cutting/separation (mechanical or thermal) of a band of the carrier film to the length of the electrodes. The carrier film can alternatively be coated directly with the patterns by means of print application processes or slit die application processes so that a peripheral outer marginal region remains that is free of electrode material and that is electrochemically inactive and, to the extent the carrier film is present as a continuous band, can be (mechanically or thermally) cut to size before or after the coating.

A compacting of the electrode materials applied to the carrier film can furthermore be achieved in the electrode formation by calendering. Calendering can take place in a single method step and the electrode materials can thereby be compacted by the selection of the electrochemically active substances LTO and LNMO for the electrodes. A common, simultaneous calendering of the anode material and cathode material that are formed on a carrier film is possible in only one step.

When making up the electrodes, an additional separator layer can be applied to the patterns, at one side or at both sides of the carrier film, by means of one of the previously named coating processes or by application of a separator layer.

In a following step, a sealing and bonding agent is applied to one side of the carrier film that is provided with an electrode onto the non-coated marginal peripheral region kept free of electrode material by doctor-blade application or by spraying and/or a sealing margin/spacer with sealing margin is inserted. Preceding this and in a supporting manner, the marginal region can be structured at one side or at both sides of the respective electrode by an additional machining step (e.g. by means of an engraved printing roll structuring or laser structuring) or it can be pre-treated with an adhesion promoter.

An electrolyte is applied to the patterns, likewise at one or both sides, in a further step. When a solid electrolyte is used, the above-named application of a separator layer can be dispensed with.

The base plate is made up in that a pattern of the anode material or of the cathode material is applied to its upper side. The top plate is made up in that a pattern of the cathode material or of the anode material is applied to its lower side. In addition, the sealing adhesive, optionally including the above-stated pre-treatment, can be applied either to the base plate or to the top plate and the separator layer and the electrolyte can be applied, as explained above.

The application of gel electrolytes or liquid electrolytes preferably takes place in an evacuated environment. If only a solid electrolyte is used, the following manufacturing steps can be carried out in an evacuated environment or in an inert gas environment.

The stacking of the electrochemical cells should be carried out in an air-evacuated environment, under inert gas (in particular with solid electrolytes) or at least under dry room conditions. In this respect, the made-up electrochemical cells are placed down onto the made-up base place after one another for so long until the desired number of electrochemical cells has been reached, less those which are formed by the base plate and the top plate. The top place can in turn be placed in adjoining them. This can alternatively take place in reverse order, i.e. application of the electrochemical cells onto the top plate and final placing application of the base plate. After placing down every single electrochemical cell or after a plurality of electrochemical cells or after all the layers have been stacked above one another, the structure can be mechanically pressed in the stacking direction such that the sealing and bonding agent wets the sealing margins in a peripherally closed manner and forms a completely leak tight termination toward the environment.

Depending on the choice of the sealing and bonding agent, an activation/polymerization of the same can be required by heating or irradiation (e.g. UV) in an additional method step.

In an apparatus for manufacturing an electrical energy storage element described above, the carrier film can be coated with the patterns in a coating unit; it can then be calendered and then cut into the shape of the electrochemical cells.

The electrodes, the base plate and the top plate have the electrochemical cells applied in an assembly unit, as has already been described above.

It can be adjoined by a sluice into which the electrochemical cells or the base plate and top plate are transported and the sluice chamber can then be quickly evacuated or flooded with inert gas. This sluice preferably has a very small chamber volume and can have a transport system, e.g. a transport belt.

The sluice can be adjoined by a chamber in which a protective gas atmosphere (vacuum/inert gas/reduced humidity) is observed. A gripping mechanism for the stacking and the mechanism for pressing the electrochemical cells can be present in this chamber. This gripping mechanism should also be suitable to be able to take up the base plate or the top plate. A transport system can furthermore be provided in the chamber for supplying the electrochemical cells and for expelling the completed electrical energy storage elements.

A number of further sluices can be present at the chamber that allow the supply of the electrochemical cells, the base plate and the top plate, on the one hand, and the leading off of the completely stacked electrical energy storage elements, on the other hand, from different sides.

The combination of the structure of the electrical energy storage element in accordance with the invention, the method and the apparatus for manufacture make possible a significant reduction of the product and manufacturing costs with a considerable increase in the volume utilization factor of such an electrical energy storage element with respect to known battery systems. Cobalt is dispensed with in the active materials; the separator layer can optionally be omitted; and instead of copper films, films of aluminum, steel or electrically conductive plastics can be used as carrier films. The manufacture of the functional layers (electrodes, electrolyte) can take place with printing processes which can be carried out simply. Optionally, the method steps for electrolyte filling, evacuation and shaping can be dispensed with. The manufacturing costs can be decisively reduced by the possible single-stage calendering that is possible due to the selection of the electrode materials (LNMO/LTO).

The structure of the electrical energy storage element in accordance with the invention has specific advantages that result from the high degree of system integration and from the layer structure in the interior of the electrical energy storage element. It can be named as the most important advantage that the electrical energy storage element in bipolar construction, in particular in a large-area embodiment, allows a high volume utilization and thus a correspondingly high energy density, i.e. the proportion of the non-active parts, in particular regions that are filled with sealing and bonding agent, can be kept very small with a system voltage of up to several hundred volts.

A further advantage of the described structure is that the electrical energy storage element does not necessarily require any additional housing. The stability of the electrical energy storage element can be achieved solely by the base plate and top plate and by the solidified sealing and bonding agent located at the periphery, optionally with the aid of a separator element. A very high performance can furthermore be achieved by the stacked design due to very small electrical transition resistances between the individual electrochemical cells since the electrical contact from cell to cell takes place areally through the thin carrier film and, unlike conventional batteries, no further connection elements are required. The electrically conductive carrier films should have a layer thickness which is between 5 µm and 30 µm to allow sufficient mechanical stability and bearing capacity.

The selection in accordance with the invention of the thermally stable electrode materials LNMO or $LiCoPO_4$ or $LiNiPO_4$ and LTO and the use of gel electrolytes or of solid electrolytes can ensure high security in the operation of the electrical energy storage element, also in case of a defect, since the decomposition temperatures are higher than in conventional electrode materials and electrolyte materials. No liquid, combustible electrolyte is present that may escape under certain circumstances. The electrochemically active materials allow a high individual cell voltage of more than 3 V and thus a high energy density due to their electrochemical potential. The electrode potentials are furthermore in regions that allow uniform materials to be used for the electrodes such as light aluminum films or plastic films, unlike conventional active material pairings that require Al films for the cathodes and heavier Cu films for carbon anodes. In addition, the structural expansion of the high-voltage cathode materials and LTO during the intercalation and deintercalation of the lithium is smaller than with conventional materials so that the electrode materials experience smaller volume changes during the charging and discharging of the electrical energy storage element and smaller mechanical strains are induced in electrodes. A higher long-term stability can thus be achieved. A high surface assignment and an accompanying increased energy density can be achieved.

The use of LTO instead of carbon in the anode furthermore has the advantage that no lithium dendrite formation, so-called "lithium plating", can occur so that a potential safety risk in the operation of the electrical energy storage element is eliminated with respect to conventional material systems. The lithium plating which is avoided at the material side additionally allows the anode layers and cathode layers to be produced with the same load assignment since the anode surface does not have to be larger than the cathode surface, as with carbon-based batteries and the anode additionally always has to be designed with a higher load assignment than the cathodes The surfaces and/or masses of electrodes of the electrochemical cells of an electrical energy storage element can at least be kept approximately the same.

The risk of a lithium dendrite formation can be reduced since 5-15% more anode material does not have to be included in an electrochemical cell of an energy storage module than stoichiometrically necessary, as is conventionally required. LTO as the anode material does not form any SEI (solid electrolyte interphase). On the one hand, no classical formation process accordingly has to be carried out and, on the other hand, the chemical system thereby has a longer life.

The method of manufacturing the electrical energy storage element additionally has the advantage that apart from the bonding no joining processes are required, except for an electrical connection for possibly necessary electrical contact elements and this bonding process can be integrated into the stacking process. A time-intensive filling process can be dispensed with due to the areal application of the electrolyte. The stacking of the electrochemical cells under vacuum additionally replaces an additional evacuation step. The classical formation over several days can equally be dispensed with. The preceding points represent a saving in value-creating processes and system technology required for this purpose, which has a significantly positive effect.

The apparatus in accordance with the invention for manufacturing is advantageously suitable for processing large-area electrodes (roll-to-roll processes and areal conveying systems) and thus for manufacturing large energy storage modules. At least the outer geometry of the margin of an electrical energy storage element can be adapted to the requirements of the respective application and in particular to the available installation space in which the outer marginal contour of the electrochemical cells can be cut out or selected in accordance with the base plate and top plate.

Individual electrochemical cells that are arranged directly above one another in the electrical energy storage element can successively differ in their size and outer marginal contour. Geometries of an electrical energy storage element adapted to the respective demands can thereby be obtained that are, for example, not formed as rectangular, square or otherwise regular.

The invention will be explained in more detail by way of example in the following.

There are shown.

EXAMPLE 1

Figure 1:
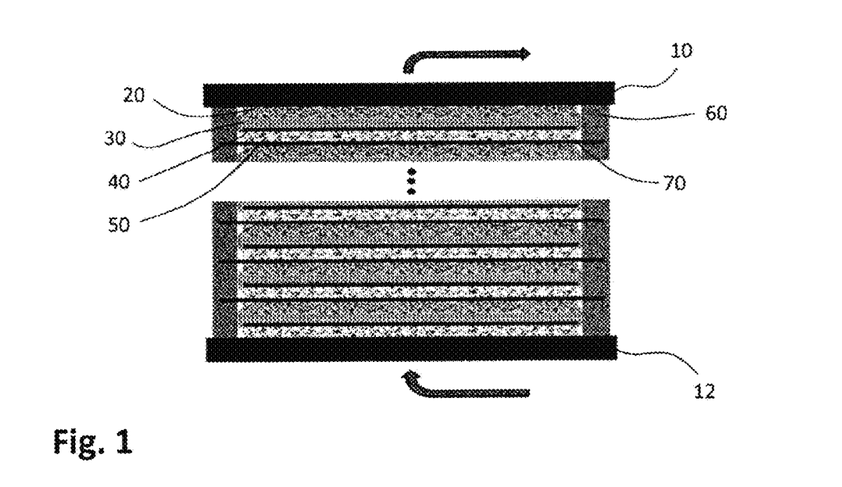
FIG. 1 in schematic form, an example of an electrical energy storage element in accordance with the invention.

An electrically conductive carrier film 70 of aluminum having a thickness of 15 μm and a width of 100 mm can be used for the manufacture of electrical energy storage elements in accordance with the invention.

To manufacture the cathode 20, it is coated in a roll-to-roll process on one side with an LNMO suspension in N-methyl-2-pyrrolidone (NMP). The cathode 20 thus obtained has a composition of 92 wt. % LNMO, 4 wt. % conductive additive, and 4 wt. % PVDF. A surface capacity of 50.6 Ah/m$^2$ is achieved in this respect. The coating takes place intermittently.

To manufacture the anode 50, the other side of the carrier film 70 is coated with an LTO suspension in NMP in a second coating step. The anode created has a composition of 92 wt. % LTO, 4 wt. % conductive additive and 4 wt. % PVDF. A surface capacity of 52.9 Ah/m$^2$ is achieved in this respect. The coating takes place intermittently.

The dried electrode band coated at both sides with respective active anode material and cathode material is compacted in a subsequent calendering process so that 20% porosity of the electrodes is realized for both coatings.

In a final step, a separator layer 40 of an aqueous $Al_2O_3$ suspension is applied to the anode side; an SBR/CMC binder system is used. A layer thickness of approximately 30 μm and a porosity of 30% is produced.

The $Al_2O_3$ and anode coating 40, 50, the cathode coating 20 on the other side of the electrode are removed down to the naked carrier film 70 by means of laser sublimation to produce an uncoated margin around the separate coating surfaces. A $CO_2$ laser of a 60 W power coupled to a transversely working laser mirror optics is used for this.

The electrodes 20, 50 are subsequently separated by thermal separation of the carrier films using a 1000 watt solid body laser having a cutting optics. Electrodes 20, 50 are created in this process, for example, having the dimensions: width 100 mm and length 195 mm.

A top plate 10 comprising 3 millimeter thick aluminum is coated in the same way as explained above with the cathode material at the lower side in a manner such that an uncoated peripheral margin of 20 mm width remains and is dried. In a following step, the coating of the top plate 10 is compacted in a calendering process.

A base plate 12 comprising 3 millimeter thick aluminum is coated in the same way as explained above with the anode material and the separator layer 40 at the upper side in a manner such that an uncoated peripheral margin of 20 mm width remains and is dried. In a following step, the coating of the base plate 12 is compacted in a calendering process.

Subsequently, a sealing frame 60 comprising polypropylene (PP) and having a height of 320 μm and a peripheral width of 20 mm is bonded onto the base plate 12 and the electrodes 20, 50 with the aid of a chemically stable two-component adhesive.

A liquid electrolyte 30 comprising ethylene carbonate, diethyl carbonate or 1M $LiPF_6$ is applied by doctor blade to the porous separator layer 40.

The bipolar structure provides that the electrodes 20, 50 are stacked in a manner such that the anode side and the cathode side are opposite respective electrodes disposed above one another and that thus a plurality of electrochemical cells in series connection result. The bottommost and topmost layers form a base plate 12 and top plate 10 respectively that are formed as aluminum sheets and form the current collectors of the battery. The base plate 12 and the top plate 10 are for this purpose likewise coated with the respective electrode material and the base plate 12 is provided with a separator layer 40, electrolyte 30 and the sealing and bonding agent in the region 60. The seals are applied in a manner to the margins of the electrodes 20, 50 or the base plate 12 or top plate 10 such that they hermetically enclose the inner structure, prevent a contact of the film margins of adjacent electrodes and enclose the edges of the carrier films.

EXAMPLE 2

The base plate 12 is clamped into a holding apparatus that holds the plate from below for manufacturing a stack of electrochemical cells. An electrode is supplied and placed onto the base plate 12 with the aid of a vacuum gripper in a manner such that the coated surfaces are opposite one another. The environment is then evacuated down to a pressure of 20 mbar and the electrode is subsequently pressed onto the base plate 12 by means of a punch with a compressive force of 10 kPa. For curing, the two-component adhesive is heated in this process to 80° C. by means of a heating cartridge. The next electrode is subsequently supplied and placed on; the environment is evacuated; the electrode is pressed on; and the adhesive is heated. This is repeated until 351 electrodes lie in a stack on the base plate.

In a final step, the top plate 10 is supplied by means of a gripper and placed onto the stack; the environment is subsequently evacuated; the top plate 10 is pressed on; and the adhesive is heated.

EXAMPLE 3

Figure 2:
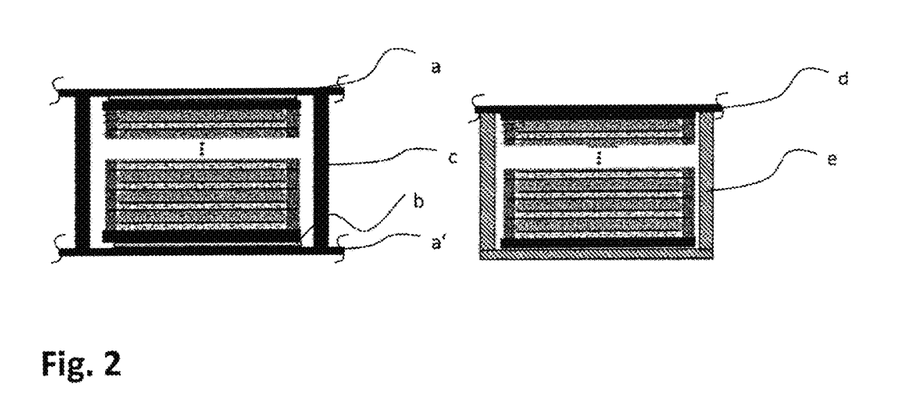
FIG. 2: integration solutions for electrical energy storage elements.

A possible installation in the underbody of a vehicle is shown at the left in FIG. 2. a=intermediate vehicle body; a'=vehicle underbody; b=thermally conductive insulation layer, bond; c=vehicle carrier; right: the installation is shown at the lower side of a solar module; d=solar module; e=module frame.

The integration of the stack of electrochemical cells can takes place at and in all large-area construction spaces. The vehicle underbody or the rear side of solar modules can be named by way of example here. A vertical installation at walls is conceivable.

In the embodiment shown at the left in FIG. 2, the vehicle underbody, the stack is integrated between the sills/longitudinal chassis beams (c), crossmembers and the underbody (a') and the intermediate body (a). These elements represent the battery component together with the stack. The marginal elements primarily have supporting functions and represent a protection on crashes at the floor, sides, rear or front and thus represent the mechanical connection to the vehicle. The stack can be fixed laterally by beads, spacers or a compensation mass. The degassing in the event of damage can likewise take place via the structures a, a' and c. Since these sections can be hollow, they act as a conductor. The sensor contacting of the individual layers takes place laterally via sensing and balancing contacts that are introduced during the stacking process and that are led laterally upwardly through the intermediate base to the monitoring module. The electrics and electronics can be arranged in a space-optimized manner in the vehicle beneath the front and rear seats.

The stack should be loaded to ensure a good performance. It is the aim in this respect to be able to take up forces on the expansion by intercalation or aging. A preload beyond the weight of the battery of approximately 100 N/m² should at least be present to obtain good transverse stability by friction in the stack. During the integration into the vehicle, the electrode area must be selected as large as possible to still allow the realization of modular approaches in the chassis. Energy contents that cannot be achieved by area accordingly have to be adapted by higher system voltages. Voltage ranges of over 1 kV are conceivable with bipolar batteries. The converter technology (high-voltage transistors up to >1500 V) and the insulation technology (e.g. polyimide with a thickness of approximately 0.06 mm) has to be used accordingly.

In the example shown at the right in FIG. 2 that relates to a solar module, smaller areas (approximately 1.2 m²-1.6 m²) are available. The electrical energy store is directly installed or integrated on the rear side of the solar module. Capacities of approximately 60 Ah to 80 Ah per layer can thus be implemented in theory. The aim should be to remain below 60 V per module, which allows an energy storage capacity per module of approximately 1.5 kWh. It must be noted that monitoring technology and converter technology are additionally required per module. The aim in this respect should be to configure the electrical energy storage element below or above the maximum electrical voltage range of the solar module so that the converter either has to increase or decrease the electrical voltage. This means, for example, an electrical energy store having a voltage range of less than 10 V or more than 40 V, depending on the solar module and the storage amount per module. It is still necessary to observe a good thermal insulation with solar modules since temperatures of >40° C. or less than −20° C. can result in greater aging or a clear increase in the internal electrical resistance.

Figure 3:
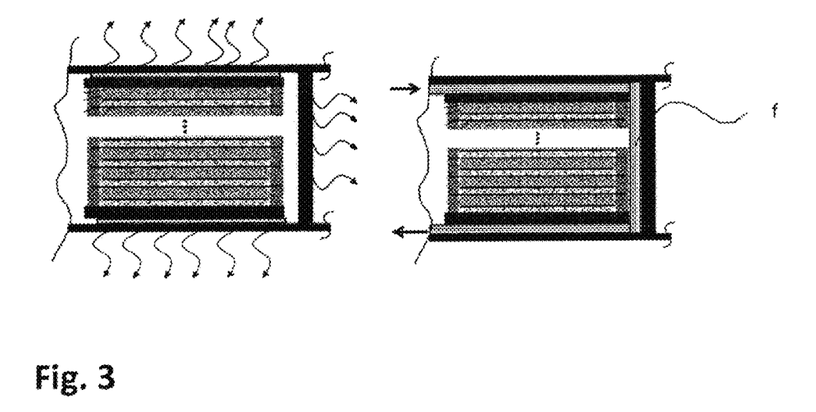
FIG. 3: temperature-controlling or cooling concepts for electrical energy storage elements.

FIG. 3 shows possible temperature-controlling or cooling concepts.

The cooling by convection and thermal conduction is illustrated schematically at the left in FIG. 3 and at the right thereof cooling via air, liquid cooling agent or an evaporator for the example of the vehicle integration; f=coolant flow.

The cooling concept of the stack of electrochemical cells with which an electrical energy storage element is formed (bipolar stacks) depends greatly on the size and on the performance demands of the respective battery. In principle, small currents standardized to the nominal capacity can be assumed due to the large surfaces of the battery and the associated high surface capacity. Charging and discharging times of 1 to 2 hours are conceivable. This represents a comparatively small strain for a cell. The internal resistances are correspondingly likewise small and are well below 0.6 mOhm/m². The power loss in the system is thereby small and only a little heat is released. The thermal transport within the layers is larger than perpendicular thereto by approximately a factor of 10. The metal carrier films represent a very good thermal conductor and transport it laterally to the outside where an air cooling or liquid cooling can be installed; an additional cooling can possibly even be completely dispensed with since the free convection and thermal conduction is sufficient for a corresponding temperature control. Instead of a cooling, a heating can also be achieved in an analog form when in particular waste heat can be utilized via a medium (liquid or air) such as the coolant.

The invention claimed is:

1. An electrical energy storage element in which a plurality of electrochemical cells that are each formed with a cathode (20) and an anode (50) as electrodes and with an electrolyte (30) are arranged stacked above one another and are enclosed at one side by a cover plate (10) formed from an electrically conductive material, and at the opposite side by a base plate (12) formed from an electrically conductive material, wherein the base plate (12) is coated with a cathode (20) or an anode (50) and the cover plate (10) is coated in a complementary manner with an anode (50) or a cathode (20); and the anodes (50) and cathodes (20) are each formed at oppositely disposed surfaces of an electrically conductive carrier film (70) having an outer peripheral margin which is free of electrode material and which connects adjacent electrochemical cells to one another in a hermetically sealed manner with respect to the environment by a sealing and bonding agent, each electrically conductive carrier film individually contacted with electrically insulated wires that are led through said sealing and bonding agent;

wherein the anodes are formed from a lithium titanate (LTO) having a spinel structure and the high-voltage cathodes are formed from a lithium nickel manganate (LNMO) having a spinel structure or from lithium phosphates (LP) in an olivine structure, and a respective separator layer (40) is present between the electrolytes (30) and an electrode of an electrochemical cell with a gel-like electrolyte (30) and no separator layer (40) is present with a solid electrolyte.

2. An electrical energy storage element in accordance with claim 1, characterized in that anodes (50) are formed from $Li_4Ti_5O_{12}$ as LTO, the cathodes (20) are formed from $LiNi_{0.5}Mn_{1.5}O_4$ as LNMO or lithium phosphates as $LiCoPO_4$ or $LiNiPO_4$ and the electrolyte (30) is formed with a salt conductive for lithium ions or a polyelectrolyte, a polymer having ionizable anionic and/or cationic groups or with ionic liquids or $Li_7P_3S_{11}$ or $Li_{1.5}Al_{0.5}Ge_{1.5}(PO_4)_3$ as a crystalline ion conductor and/or a separator layer (40) with $Al_2O_3$, a glass conducting lithium ions.

3. An electrical energy storage element in accordance with claim 1, characterized in that the electrolyte (30) is formed from $LiPF_6$, LiTFSI or $LiClO_4$, that are embedded with ethylene carbonate, diethyl carbonate or propylene carbonate in a polymer matrix that is formed with polyethylene oxide (PEO), polyvinylidene fluoride (PVDF), an acrylate or imidine; or N-alkyl-N-methylpyrrolodinium bis(trifluoromethanesulfonyl)imide ($PYR_{14}TFSI$) and with LiTFSI as the salt conducting lithium ions as the polyelectrolyte.

4. An electrical energy storage element in accordance with claim 1, characterized in that a monitoring module, an interface module, a jacket module and/or a temperature-controlling or cooling module are present.

5. An electrical energy storage element in accordance with claim 1, characterized in that polyvinylidene fluoride (PVDF), styrenebutadiene rubber (SBR), polyvinyl alcohol (PVA) or carboxymethyl cellulose (CMC) is contained in the separator layer (40).

6. A method of manufacturing an electrical energy storage element in accordance with claim 1, characterized in that a carrier film (70) is respectively coated at two oppositely disposed surfaces with an anode material and at the oppositely disposed side with a cathode material such that an outwardly peripheral margin free of the respective electrode material remains or the electrode material is removed from this margin; and at least one of the two electrodes is coated with a separator layer (40) with a gel-like electrolyte and is subsequently coated with electrolyte material or the respective electrode is directly coated with electrolyte material with a solid electrolyte; individual elements that each form an electrochemical cell are subsequently obtained by a separation and are stacked over one another such that cathodes (20) and anodes (50) are arranged alternatingly facing upwardly and in this respect the bottommost electrochemical cell is placed onto a base plate (12) which has been coated with a cathode (20) or an anode (50), with the respective complementary electrode that is arranged in the direction of the electrode formed on the base plate (12) facing in the direction of this electrode, being placed onto the topmost electrochemical cell of a cover plate (10) on which an electrode complementary to the topmost electrode of the topmost electrochemical cell is present, after reaching the desired number of electrochemical cells to be stacked; and a closing of the electrochemical cells with respect to the environment is achieved by a sealing and bonding agent at the outer margins free of electrode material.

7. A method in accordance with the claim 6, characterized in that a closing of the electrochemical cells with respect to the environment is achieved with a sealing and bonding agent as well as with a separator element at the outer margins free of electrode material.

8. A method of manufacturing an electrical energy storage element in accordance with claim 1, characterized in that the electrodes, the separator layer (40) and/or the electrolyte (30) is/are formed by application by doctor blade, printing, spraying, dispensing, powder coating or electrostatic processes.

9. A method in accordance with claim 8, characterized in that a compaction of the electrode materials applied to the carrier film is achieved by calendering.

10. A method in accordance with the claim 9, characterized in that the assembly and stacking of the electrochemical cells and of base plate and cover plate (10) are carried out under vacuum conditions or in an inert environmental atmosphere.

11. An apparatus for manufacturing electrical energy storage elements in accordance with claim 1, characterized in that at least the stacking and assembly can be carried out in a chamber that can be closed by at least one sluice and that can be evacuated or filled with an inert gas.

12. An apparatus in accordance with claim 1, characterized in that a gripping mechanism is present in the chamber that is configured at least for stacking and for pressing the electrochemical cells.

* * * * *